No. 643,212. Patented Feb. 13, 1900.
C. F. WARREN.
COMBINED WARMING OR COOLING UTENSIL.
(Application filed Sept. 6, 1899.)
(No Model.) 2 Sheets—Sheet 1.
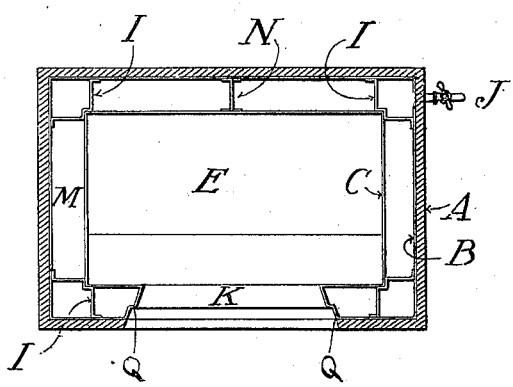
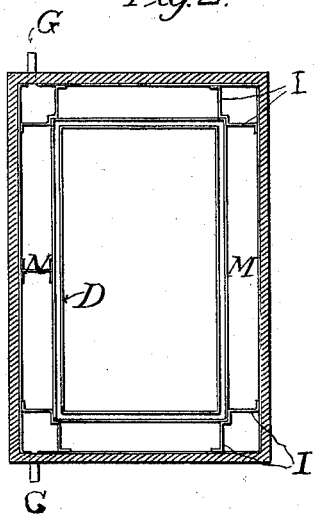
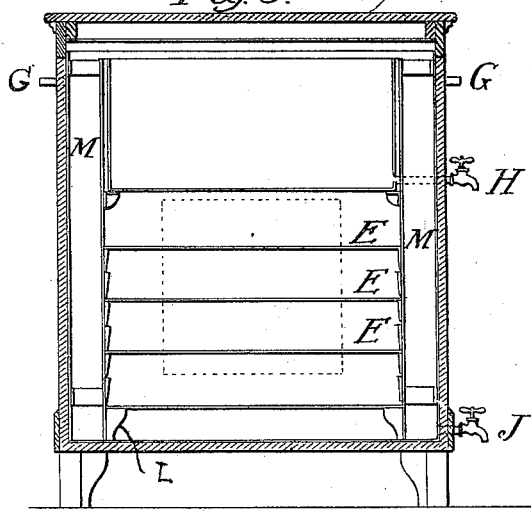
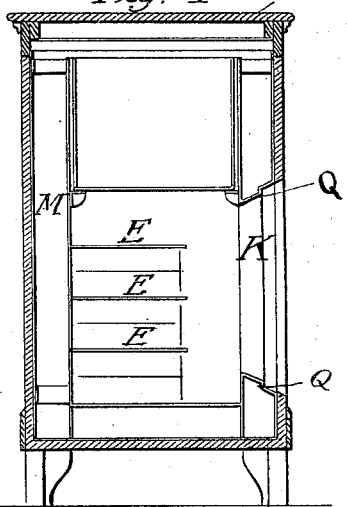
Witnesses. Inventor.

No. 643,212. Patented Feb. 13, 1900.
C. F. WARREN.
COMBINED WARMING OR COOLING UTENSIL.
(Application filed Sept. 6, 1899.)

(No Model.) 2 Sheets—Sheet 2.

Witnesses.

Inventor.
Charles F. Warren
Attorneys.

UNITED STATES PATENT OFFICE.

CHARLES F. WARREN, OF PORTLAND, MAINE.

COMBINED WARMING OR COOLING UTENSIL.

SPECIFICATION forming part of Letters Patent No. 643,212, dated February 13, 1900.

Application filed September 6, 1899. Serial No. 729,607. (No model.)

*To all whom it may concern:*

Be it known that I, CHARLES F. WARREN, a citizen of the United States, residing at Portland, in the county of Cumberland and State of Maine, have invented certain new and useful Improvements in a Combined Warming or Cooling Utensil; and I do hereby declare the following to be a full, clear, and exact description of the invention, such as will enable others skilled in the art to which it appertains to make and use the same.

My invention relates to improvements in a combined heater or cooler for food or other articles.

It consists of an outer casing, a middle casing, and an inner casing, and a space between the outer and middle casing, through which a liquid, either warm or cold, may be caused to circulate, so that the food or other article contained within the two inner chambers may be respectively warmed or cooled, as is desired.

Figure 5:
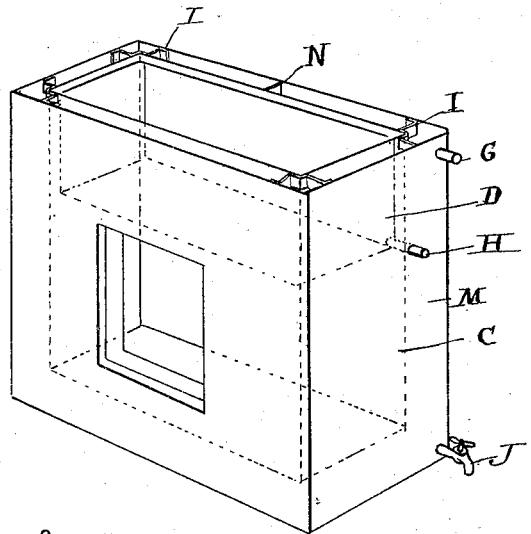
Figure 6:
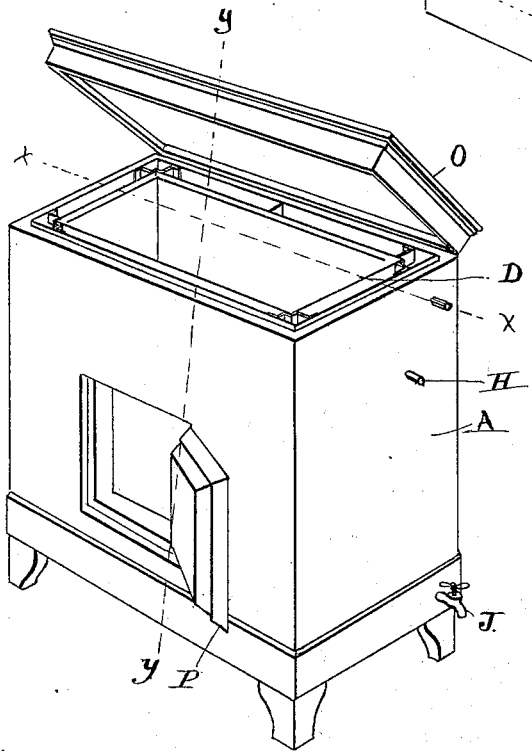

In the drawings herewith accompanying and forming a part of this application, Figure 1 is a cross-section of the bottom portion. Fig. 2 is a cross-section of the top portion. Fig. 3 is a vertical section on lines X X in Fig. 6. Fig. 4 is a vertical section on lines Y Y of Fig. 6. Fig. 5 is a perspective of the three cases, and Fig. 6 is a perspective of the device.

The same letters refer to like parts in all the figures.

In said drawings, A represents an outer casing, which may be of wood or any other suitable material. This outside case may be lined with a strip of galvanized iron or some metallic substance, if desired, and as shown at B in Fig. 1. Placed inside said outer casing are legs or supports L. Mounted on said supports in any suitable manner so that it may be easily removed therefrom is the middle casing C, which may be made of metal or any suitable material. Within said receptacle are shelves E and supports F, arranged at any desired intervals, the shelves being so constructed that they can be removed at pleasure and the supports arranged so that the shelves may be adjusted vertically and at any distance apart that may be required. Said middle case C is smaller in size than the outer case A, leaving a considerable free space M between its walls and the inner walls of the outer case, the object of this being to allow a space through which water or any other liquid may be caused to circulate, whether said liquid is warm or cold. Attached also to said middle case are stops I, the object of these being to hold the middle receptacle at a proper distance away from the outer case, so that the passage M may be left clear on all of its sides. At the back of said middle case and extending vertically thereon is a partition N, which extends from the top of said middle case to the bottom of the outer case and fits closely between said middle case and the outer case, the object of this being to cause a practically water-tight connection between the outer and the inner case. The outer case also contains inlet-pipes and outlet-pipes G. It will be seen that when the liquid is allowed to enter the space M between the middle and the outer case the natural tendency of it will be to run in a straight direction away from its inlet. Were the partition or stop not made as arranged, the liquid would flow from one side of the outer case and would not tend to circulate freely around the inner case. By means of this vertical partition the water enters through the inlet, strikes against the partition, and is caused to return. The passage around the middle case being entirely free and open, except as prevented by the before-mentioned partition, causes the water to circulate freely around the inner tank and, whether warm or cold, to impart to said middle tank either a warm or a cold temperature. Adapted to be removably placed within the middle tank is a third or inner tank D. This also may be made of metal and adapted to fit within the middle case, so that a small air-space is allowed between its walls and the walls of said middle case. This case is adapted, if it is required, to hold a piece of ice for giving additional cold to the middle case, or it may simply be used as a receptacle for food or other articles, as the circumstances require. If this inner case be used for holding ice, in order to dispose of the water which accumulates as the ice melts, I provide an opening H, extending from the bottom thereof and through one of the supports L, which hold the middle case in position. I preferably make this outlet in this manner, for it is evident that if I did not so construct it the water would accumulate in the tank, and if it were to be drawn off into the open space M the water filling that space would tend to rush in and fill the tank instead of causing the same to be drawn, as is necessary to accomplish the best results. I provide the other case with a cover O, which may be hinged thereto in any suitable manner, and I also provide the same with a door P, so that food or other articles may be inserted within the middle case. In order to prevent the water or liquid which circulates in the opening M from breaking through the door, I provide a series of stops Q, which are adapted to fit over the door-opening in the side of the outer casing. These may be covered with felt, cloth, or any other suitable material, so that when the middle case is placed in position they will form an absolutely water-tight connection and prevent the water from breaking out into the middle case or leaking out through the door. I also provide the bottom of the outer case with an outlet J, so that the water may be let out when desired, especially when it is deemed necessary to remove the cases and to thoroughly cleanse them.

My improved device may be used, as is evident, both as a warmer and cooler for food or other articles, it only being necessary to cause the space M to be filled with either warm or a cold liquid. It has the advantage, especially when being used as a warmer, of preventing the articles that may be placed in the middle case from being thoroughly dried; yet at the same time they may be kept at an even temperature for a considerable space of time, and in localities where it is inconvenient to procure ice by the admission of cold water or a continual stream of cold water within said space M a uniform and cold temperature may be maintained for a sufficient degree of cold to preserve articles for a considerable space of time. It is especially applicable under the latter head for keeping and preserving milk or cream.

Having thus described my invention and its use, I claim—

In a combined warming and cooling utensil, in combination, an outer casing, a hinged cover on said casing, a middle casing within said outer casing and kept at a distance away from the sides of said outer casing by means of lugs extending from the sides thereof and kept distant from the bottom of said casing by means of movable legs, a vertical partition extending from the middle of the back side of the middle casing to the inner side of the back wall of the outer casing, the space between the middle and outer casing adapted to be filled with a liquid, outlet and inlet ports in the outer casing and an inner casing mounted within the middle casing leaving an air-space between its outer wall and the inner wall of the middle casing and openings in the side of the outer casing extending into the middle casing and means for preventing the liquid from entering the middle casing, substantially as and for the purposes set forth.

In testimony whereof I affix my signature, in presence of two witnesses, this 2d day of September, A. D. 1899.

CHARLES F. WARREN.

Witnesses:
NATHAN CLIFFORD,
MARION RICHARDS.